Figure 1:
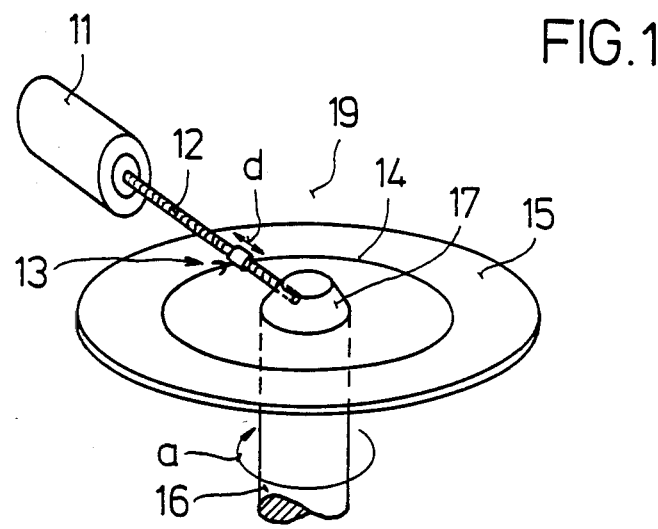

United States Patent [19]

Kraus et al.

[11] Patent Number: 4,623,942
[45] Date of Patent: Nov. 18, 1986

[54] METHOD AND ARRANGEMENT FOR DETECTING ERROR SIGNALS IN A DISK-DRIVE, AND A MAGNETIC TEST DISK THEREFOR

[75] Inventors: Gerold Kraus, Lahr; Walter Huber, Oberkirch; Joachim Hack, Ludwigshafen; Klaus Schulze-Berge; Roland Sold, both of Mutterstadt, all of Fed. Rep. of Germany

[73] Assignee: BASF Aktiengesellschaft, Ludwigshafen, Fed. Rep. of Germany

[21] Appl. No.: 734,182

[22] Filed: May 15, 1985

[51] Int. Cl.$^4$ .............................................. G11B 5/48
[52] U.S. Cl. ....................................... 360/75; 360/76; 360/135
[58] Field of Search ...................... 360/75, 76, 77, 78, 360/135

[56] References Cited

U.S. PATENT DOCUMENTS

| | | | |
|---|---|---|---|
| 4,084,201 | 4/1978 | Hack et al. ................... | 360/135 |
| 4,458,274 | 7/1984 | Charlson et al. .............. | 360/75 |
| 4,513,331 | 4/1985 | Baker et al. .................. | 360/75 |
| 4,513,333 | 4/1985 | Young et al. ................. | 360/77 |
| 4,542,428 | 9/1985 | Yanagi .......................... | 360/75 |
| 4,562,494 | 12/1985 | Bond ............................. | 360/75 |

FOREIGN PATENT DOCUMENTS

| | | |
|---|---|---|
| 035915 | 9/1981 | European Pat. Off. . |
| 0106661 | 4/1984 | European Pat. Off. . |
| 2554083 | 6/1977 | Fed. Rep. of Germany . |
| 3117911 | 11/1982 | Fed. Rep. of Germany . |
| 3335560 | 5/1984 | Fed. Rep. of Germany . |

OTHER PUBLICATIONS

Baasch, H. J. et al., "Azimuth and Position Detection Method for a Magnetic Read/Write Head", *IBM Technical Disclosure Bulletin*, vol. 26, No. 7A, Dec. 1983, pp. 3343–3348.

*Primary Examiner*—George G. Stellar
*Attorney, Agent, or Firm*—Keil & Weinkauf

[57] ABSTRACT

A method and an arrangement for detecting error signals in a magnetic disk drive apparatus uses a test disk which has a plurality of test tracks distributed over the recording area and containing special test signals, a distinction being made between orientation, adjustment and azimuth bursts. Based on the normal position of the recording tracks of the magnetic disk, the spacing of the test tracks could depend on the type of step motor if such a motor is used in the positioning device. By special control, hysteresis errors can be measured in addition to tracking errors, eccentricity errors and azimuth errors.

An advantageous use is for all types of disk drives, preferably FlexyDisk drives.

13 Claims, 5 Drawing Figures

METHOD AND ARRANGEMENT FOR DETECTING ERROR SIGNALS IN A DISK-DRIVE, AND A MAGNETIC TEST DISK THEREFOR

The present invention relates to a method and an arrangement for detecting error signals in a disk drive including a head positioning system, said method comprising the use of a magnetic test disk which has test signals recorded in a plurality of test tracks distributed over the recording area of the test disk, said test signals in the test tracks being read, deviations of the read signals from their desired position and desired amplitude being determined and mean values being derived therefrom, and a magnetic test disk for carrying out the method.

The quality of the writing and/or reading operation in a magnetic disk drive apparatus is determined by the positioning of the magnetic head above the disk during their movement relative to one another. Particularly in the case of flexible recording media, e.g. FlexyDisks ®, and their associated write and/or read device, it is important to be able to displace the device, in particular the magnetic head and/or the head adjustment unit, relative to the recording medium. This operation is referred to as track adjustment. Adjustment or CE disk bearing control signals are used for this purpose. For example, according to German Laid-Open Application DOS No. 2,554,083, the control signals are magnetic flux changes which extend alternately on either side of the center line of the recording track and which are recorded on a single test track in the central region of the disk. These controls signals are adjustment signals which are provided around the test track and are divided into groups by orientation signals which differ in amplitude.

® means a registered Trade Name owned by BASF Aktiengesellschaft, Ludwigshafen, Germany By using different adjustment signals and orientation signals, the signals can be better distinguished, and represented on an oscilloscope in a simple manner, so that an image of the entire extent of the test track can be produced, thus permitting a simple head position check and head adjustment.

German Laid-Open Application DOS No. 3,117,911 discloses the use of a test element which has pairs of test tracks which are partially or completely adjacent to one another and have a positive or negative track displacement with respect to a normal position of a test track. To align the scanning head, the test tracks with displacement are read, and as soon as a read error of predetermined magnitude occurs, the mean of the read signals of the pair of test tracks is formed and is used to readjust the scanning head. The said publication furthermore states that, in the case of errors of equal magnitude which occur in two non-adjacent test tracks, it is possible to form the mean of the read signal of a first positive test track and of the read signal of the second negative test track and to use this mean value to produce a signal for head adjustment. The said publication furthermore discloses that, for a maximum, still processable deviation of the test signals read, the absolute value of the particular positive track displacement and of the particular negative track displacement can be registered, and a mean value constituting a quality parameter can be formed from the two values.

In any case, two error signals are thus averaged, and the mean value is used as a measure of the quality of head positioning. By using the said pairs of test tracks, twice the read time is required compared with a track scan period. Moreover, the maximum number of test tracks which can be accommodated is only half of all theoretically possible test tracks. By using indistinguishable test signals of the same magnitude in a track, information dependent on angular position, e.g. information about eccentricity, can only be obtained by a complicated procedure. When tracks have to be kept free for controlling the test program, it is precisely in this track area that information about deviations is lost.

It is an object of the present invention to provide a method for improved and more comprehensive error signal detection and evaluation.

We have found that this object is achieved, according to the invention, if the test signals consist of adjustment signals which are recorded alternately on either side of the center line of the recording track and are of the same amplitude and of orientation signals which divide the adjustment signals into groups and whose amplitude differs from that of the adjustment signals, within each group of adjustment signals, their actual position and actual amplitude are determined and a group mean is derived therefrom, the group mean values of each indivudal test track are used to calculate a track mean value, the latter is stored, and the track mean values of a number of test tracks are used to calculate an overall mean value, which is stored.

Depending on the precision required, this makes it possible for error signals to be detected, over the total possible number of test tracks in the maximum case and as a function of particular parameters or in connection with particular error effects in the normal case, and, if required, to be evaluated, for example for a quality check, or, if appropriate, to be used for head adjustment, for example in production of the apparatuses, for readjustment of the head, for example during read operation, or, if required, for theoretical correction of read signals (during read operation of the apparatus).

Advantageously said stored track mean value and said overall mean value are used at least for correction purposes in the head positioning system.

In a further measure, for drives having step motor positioning systems, the position and number of test tracks on the test disk are chosen, and the tracks scanned, so that they are just out of accord with the number of motor phases of the step motors. By this means, it is surprisingly easy also to detect the error signals occurring during the individual steps of the step motor, and to avoid suppressing just these signals.

Advantageouly, therefore, the test signals of every fourth recording track are read and evaluated in disk drives with a 3-phase step motor positioning system, while every third recording track is read and evaluated in the case of a 4-phase step motor positioning system.

A combination of test signals in the second, fifth and seventh recording track, etc., of a magnetic test disk, and appropriate scanning and evaluation according to the method, are also possible.

In practice, it is also advantageous if the test signals are read and processed serially, beginning with said reference test track, and processed serially in a first direction, for instance in the direction of increasing or decreasing track numbers, and after reversing the direction of reading the tracks are read and processed serially in the second direction, and the two-direction mean values are summed to give the overall mean value.

This makes it possible to measure the hysteresis of heat positioning by scanning in both directions in relation to a predetermined track, so that the hysteresis effects can be included in the overall mean value.

In a further step of the method, the stored overall mean value is subtracted from the track mean value of the reference test track, and the resulting mean value is used for head position correction on the reference test track.

Consequently, optimum error compensation is achieved in relation to the available recording area if the reference track is appropriately arranged.

As is known per se, a magnetic test disk for the method has test signals which consist of adjustment signals which are recorded alternately on either side of the center line of the recording track and have the same amplitude and of orientation signals which divide the adjustment signals into groups and have a distinguishable amplitude, and is equipped, according to the invention, with a plurality of such test tracks which are recorded in every third or fourth recording track, distributed uniformly over the recording area of the test disk.

This provides a CE disk (CE=customer engineer) which is simple to manufacture and has a wide range of applications. If, for example, the test disk is provided with the maximum possible number of test tracks with test signals, it is of course also possible to actuate any desired recording track sequences, for example only every third or fourth recording track, depending on the step motor just used, for the detection of error signals. Consequently, the disk has a very wide range of uses for checking a very large variety of types of apparatus.

In the test disk according to the invention, it is also possible for test tracks to be recorded alternately in every second and subsequent third recording track over at least part of the recording area. This provides a combination test disk for apparatuses having 3-phase or 4-phase step motors.

In an arrangement for carrying out the method according to the invention in conjunction with a novel test disk which is described above and which has a plurality of test tracks which are recorded in every third or every fourth recording track or in every second and subsequent third recording track, distributed uniformly over the recording area of the disk, a circuit arrangement is provided which contains a control stage for controlling the head positioning system in the 3-track, 4-track or 2-track scanning cycle, and which contains, connected to the scanning head, an evaluation stage, a mean value calculation stage and a storage stage for the error signals, and a display and/or write stage for the overall mean value.

A circuit arrangement of this type can be produced economically with commercial electronic circuit elements.

In another practical embodiment, the control stage controls the positioning system so that the scanning head system, starting from a predetermined initial track, in particular the reference test track, reads the test tracks in a first direction of increasing or decreasing track numbers and, after reversing its direction of reading into the second direction, reads the tracks in the second direction. This makes the circuit arrangement suitable for measuring the positioning hysteresis without a substantially more complicated circuit being required.

In another embodiment of the circuit arrangement, after storage of the overall mean value, the control stage controls the guiding of the scanning head system, via the positioning system, over the reference test track, and the track mean value of the reference track is either determined again or is taken from said storage stage, after which the overall mean value is subtracted from the track mean value of the reference track, and the resulting mean value is displayed and/or made available for an automatic head adjustment device.

This makes it possible for the scanning head system to be adjusted in a simple manner either manually or by means of an automatic head adjusting device.

The method and the arrangement, and the test disk for this purpose, are described below for an embodiment which is shown in the drawing.

Figure 2:
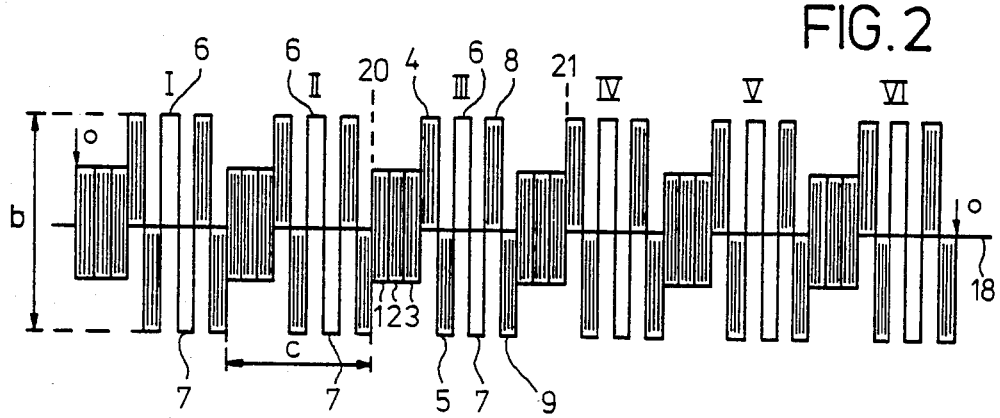
Figure 3:
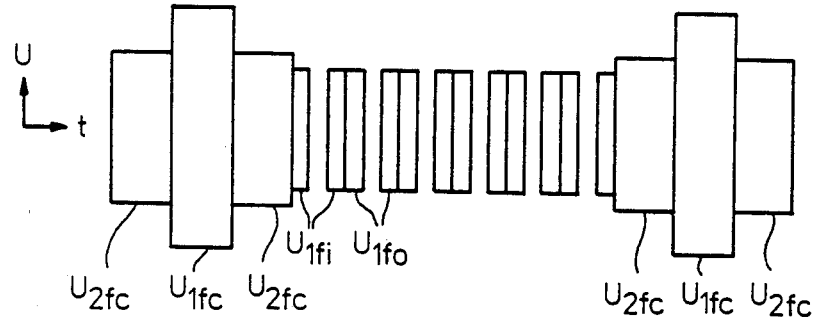
Figure 4:
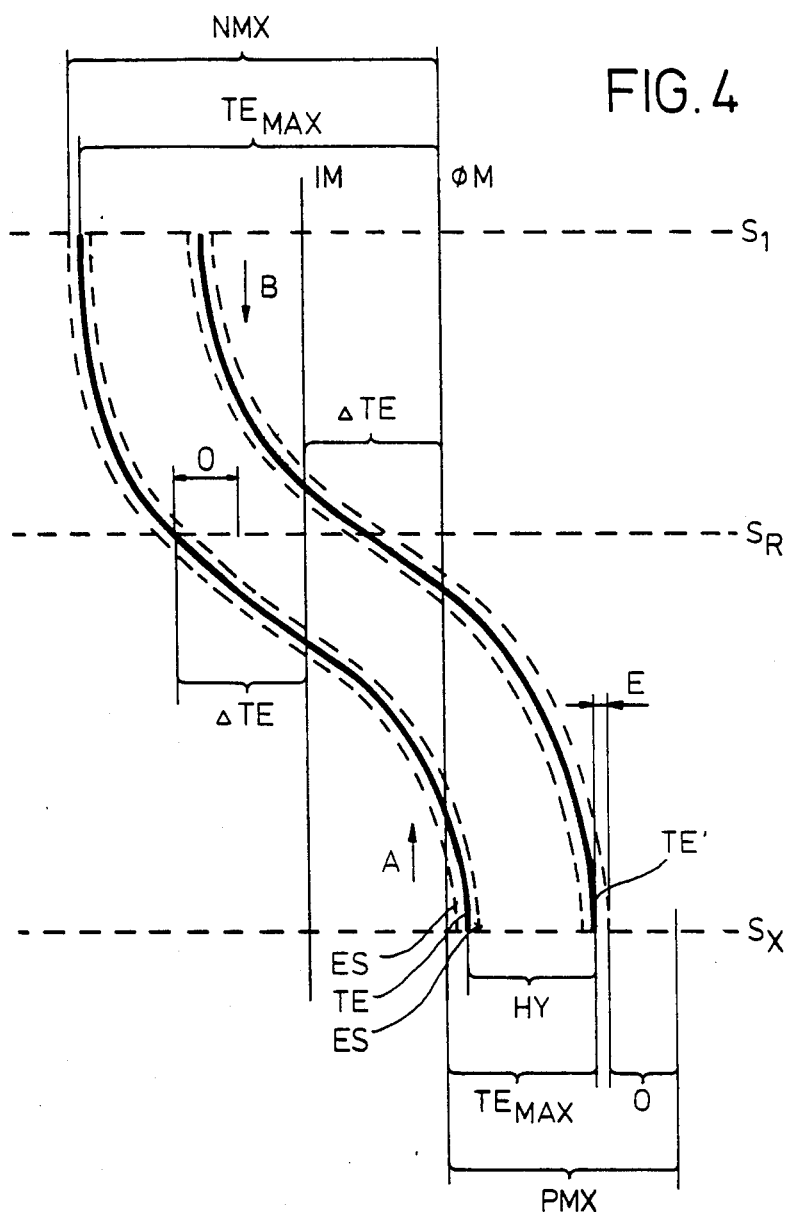
Figure 5:
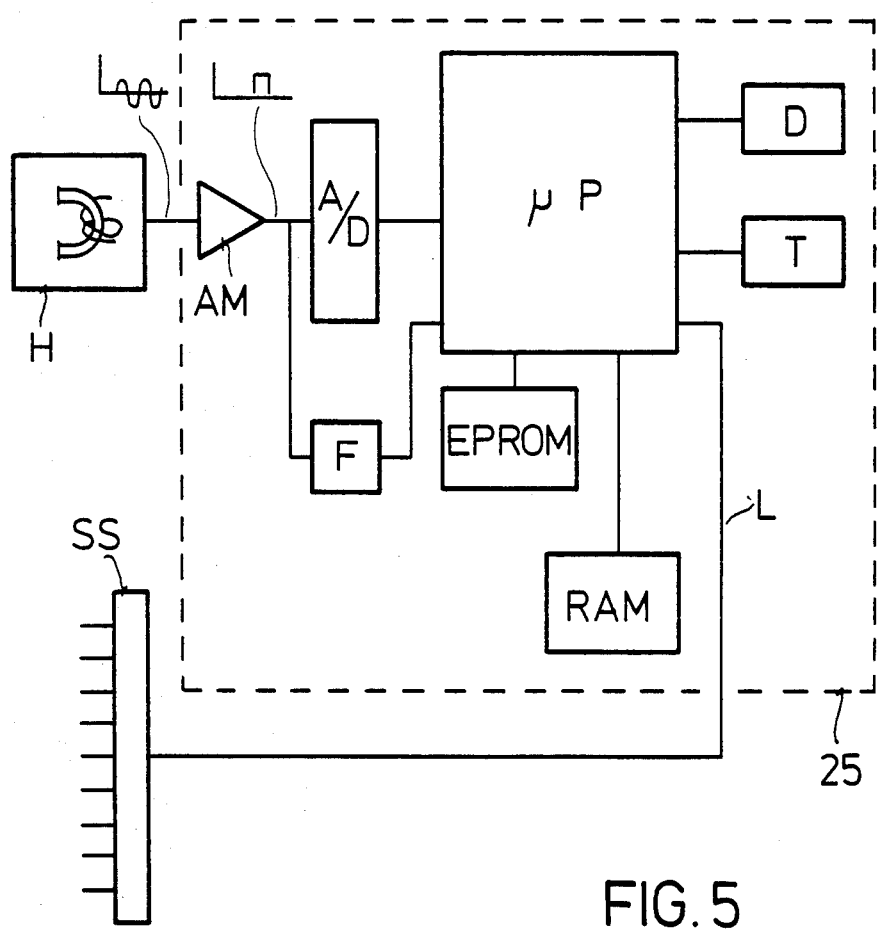

In the drawing,

FIG. 1 shows schematically a test disk with a disk drive according to the invention, FIG. 2 shows geometric serial test signals in a test track of a test disk, FIG. 3 shows a group of test signals between the dashed lines 20 and 21 in FIG. 2, FIG. 4 shows the curve for the measured deviation for a plurality of test tracks on a test disk, and FIG. 5 shows a novel circuit arrangement for carrying out the method.

The adjustment and control system 19 essentially consists of a drive shaft 16 (shown schematically), a magnetic test disk 10, and a head positioning system 11 with a spindle 12 and a magnetic head 13 of a magnetic scanning head system. The magnetic head 13 can be moved on the spindle 12 in the directions indicated by the double arrow d. 14 denotes a central circular recording track (hereinafter sometimes referred to as "track") on the disk 15. Arrow a indicates the direction of rotation of the drive shaft 16. The part 17 of the drive shaft, which protrudes through the disk 15, is slightly conical in order to facilitate centering of the disk 15.

FIG. 2 shows an embodiment of geometrically serially arranged test signals TS which extent from the center line 18 of the track, e.g. the said track 14. b denotes the track width. The test signals TS consist of a plurality of magnetic flux changes. In FIG. 2, a total of six groups of signals (I to VI) is recognizable, each of the groups having a length c. Each group consists of three orientation signals 1 to 3 which are arranged symmetrically on the center line 18 of the track, and of six adjustment signals, 4, 5 and 8, 9 which extend alternately on either side of the center line 18. The amplitudes of the orientation and adjustment signals are advantageously chosen so that they are readily distinguishable. This can be achieved in a simple manner, for example, if the orientation signals 1 to 3 consist of alternating signals of different frequency, e.g. of 2f, 1f, 2f. Here, the frequency f is the recording frequency of the data system. In the case of the FlexyDisk system, this frequency f is 250 kHz at 360 rpm. In this case, the adjustment signals advantageously have the frequency one f.

FIG. 3 shows an oscillogram of the signals between the dashed lines 20 and 21, which include the orientation signals 1 to 3 and adjustment signals 4, 5 and 8, 9 of group III, as well as the orientation signals 1 to 3 of group IV. The azimuth signals 6 and 7 are not shown in this oscillogram. As indicated in the drawing, the read voltage U scanned by the magnetic head 13 is plotted in the y direction as a function of the time t in the x direction.

The orientation signals 1 to 3 are distinguishable as read voltages U2fc, U1fc and U1fc, the voltage U1fc having a larger amplitude than U2fc. In the Example shown, the amplitudes of the read voltages U1fi and U1fo are the same. Since the amplitudes of the read voltages produced by the magnetic head 13 depend on the position of the head relative to the test track 14, the fact that the read voltages U1fi und U1fo have the same amplitude shows that (a) the head and disk adjustment is correct,
(b) the test disk is located absolutely centrically on the drive shaft,
(c) the disk or the FlexyDisk has an accurately circular shape,
(d) the drive shaft is exactly centric and
(e) the magnetic head is functioning properly.

Where U1fi and U1fo differ in amplitude, a positive difference indicates that the test disk 15 is displaced inward toward the axis, while a negative difference indicates a displacement in the opposite direction, i.e. outward.

The track displacement $\Delta s$ from the ideal position is given by the equation $$\Delta s = \frac{U1fi - U1fo}{U1fi + U1fo} \cdot \frac{s}{2}$$

wherein the track displacement $\Delta s$ and the track width s of the read head are both expressed in $\mu m$ (micrometers). By adjusting the head on the spindle 12, it is possible to correct, or at least to compensate, such track-/head adjustment errors with great accuracy. Such compensation is advantageously accomplished by adjusting the difference in amplitude of the read voltages of signal group n (where n is one of the groups I to VI) and of the voltages of the group n+3 so that they are equal, this being achieved by adjusting the head. In this way, radial eccentricity can at least be reduced to a minimum. In this example of compensating for eccentricity, the total number of signal groups has been assumed to be 6. For a different total number N of signal groups, in the case of track displacement in the signal group n the same displacement should be introduced into signal group n+N/2 in order to reduce the radial error.

The frequencies 1f and 2f may be used, but it is possible in general to use all frequencies suitable for the scanning speeds in question or for the signal lengths. The frequency 2f of the read voltages U2fc may advantageously be used for adjusting the azimuth angle of the magnetic head. However, still better adjustment of the azimuth angle is achieved by the measures described below.

In FIG. 2, two azimuth signals 6 and 7 for controlling the azimuth angle of the head H are provided, for example between the adjustment signals 5 and 8. These azimuth signals 6 and 7 can be provided in any of the groups I-VI, but are preferably provided only in a single track, for example in track 1 of a test disk.

The test signals, orientation signals, adjustment signals and azimuth signals are referred to below by the general term test signals TS.

The test disk 15 described can be provided with a plurality (a large number) of test tracks of this type. Compared with conventional FlexyDisks, which have 37 or 74 tracks, either every third or every fourth track, or every second and subsequent third track, can be provided with the test signals. In principle, however, the number of test tracks provided can be determined by the maximum amplitudes of the test signals, for example 2 useful track widths and in addition a suitably broad guard band extending to the neighboring test tracks. To permit broad application and to increase the accuracy of adjustment and control, it is advantageous to record, and to use, the maximum number of test tracks for the particular purposes.

A combination test disk may also have test tracks distributed alternately in every second and in every subsequent third track, over the entire recording area. In this embodiment, test tracks are recorded in, for example, the second, fifth, seventh (etc.) track. In this case, of course, only every second or only every third track is scanned in testing an apparatus, depending on whether a 3-phase or 4-phase step motor is present in the positioning system 11.

The error signals are detected as follows: the scanning head H, which may be a single head or a head in a double-head arrangement, is adjusted to any predetermined track, and the test signals (orientation signals and adjustment signals) are read. A particularly suitable reference track $S_R$ is track No. 16 or 32 (for 48 or 96 tpi FlexyDisks), since this track lies roughly in the center, in respect to the recording capacity of the areas between the outer edge and the inner edge of the disk. The orientation and adjustment signals are transmitted as sine waves by head H, and are converted to d.c. signals in the read amplifier by means of a peak-responding rectifier AM. The orientation signals are separated via a filter F which responds to the frequency 2f, and are fed directly to the microprocessor MP, where they are used for synchronization to eliminate fluctuations in rotary speed. The adjustment signals are also fed to the microprocessor, via an A/D converter. The microprocessor MP determines the signal amplitudes, forms the mean values, feeds individual signals or averaged signals to the EPROM or RAM memories as storage stages, and furthermore serves, via the line L to the drive interface SS, for controlling the drive functions necessary for error signal detection. The microprocessor MP is also connected to a display or write unit and/or an automatic head adjustment unit D and an input unit, for example a keyboard T. The entire circuit arrangement enclosed within the dashed line in the drawing is denoted by 25.

After determination of the adjustment signal amplitude and synchronization by the orientation signals, the microprocessor MP first forms the mean value of the individual adjustment signals (signal mean value), then the mean value of the adjustment signals of each of the groups I-VI (group mean value) and thereafter the mean value for the entire test track (track mean value).

Before the mean values can be calculated, the track error TE on the one hand and the eccentricity error ES on the other hand are invariably determined via the instantaneous amplitudes of the adjustment signals, and are stored in the RAM memory.

When error signal detection on reference track $S_R$ is complete, the next test track is approached, e.g. track 19, and the process is repeated until the last test track, e.g. track 35 or 74, has been scanned and the measured values stored or the mean values of all test tracks (overall mean value) calculated.

(Note: for the purpose of the present invention, mean value is the arithmetic mean.) For 37 tracks, there are six track mean values (No. 16, 20, . . . , 36) with the 4-track pattern and eight track mean values (No. 16, 19, . . . 34, 37) with the 3-track pattern, from which the overall mean value IM can be easily derived. These numbers apply to single-direction tests.

As stated above, it is also possible for the tracks 2, 5, 7, 10, 12, 15, 17, 20, 22, 25, 27, 30, 32, 35 and 37, i.e. every 2nd and every subsequent 3rd track, to be provided with test signals TS, so that 8 or 7 measured values are then available in the case of 37 tracks.

It is also possible to scan the test tracks S in the area of track No. 0 to No. 16 in order to obtain the complete distribution of the error signals TE (cf. the left-hand S curve in FIG. 4). The arrow A indicates the direction from which the tracks are approached, as described above. In this case, for example, approach is from the outer track $S_x$ toward the inner track $S_1$, via the reference track $S_R$.

The solid curve S is therefore formed by detecting the TE signals. The adjacent dashed S curves represent the distribution of the eccentricity values (ES).

After reaching the innermost test track $S_1$ in the method described above, the direction of track approach is changed from A (the first direction) to B (the second direction) (see arrow) and the process of error signal detection is repeated until the outermost test track is reached. Preferably, the overall mean value is formed from the error signals Te and TE' of both (first and second) track approach directions, so that advantageously the positioning hysteresis is also measured and can be evaluated. The right-hand, parallel S curve, comprising the TE' signals of the solid S curve and the ES distribution curves, is obtained at a distance HY away. This two-direction test method also gives twice the number of measured displacemewnts and gives the two-direction mean value.

In a double-head drive, it is also possible to determine the displacement 0 between the heads on the track $S_R$, and to use it to determine the maximum error signal $TE_{max}$.

The overall mean value obtained via an approach direction A or B or approach directions A and B can be represented as a straight line IM (actual overall mean value). The distance $\Delta TE$ between this straight line and the track mean value for reference track $S_R$ corresponds to the difference between the overall mean value TM and the track mean value. The scanning head H over the reference track $S_R$ must be displaced by the distance $\Delta TE$ in order to minimize the error signals over the entire recording area, i.e. in order to optimize the recording and playback quality of the apparatus. In the drawing, this corresponds to the parallel straight line $\phi M$. Relative to this, the positive maximum PMX (lower right) is obtained, the double-head displacement 0 as well as the maximum eccentricity value E being taken into account; the negative maximum (NMX) appears at the top left, the maximum TE value, $TE_{max}$, being generated. The positive and negative $TE_{max}$ value thus differ very greatly in magnitude.

These maximum values $TE_{max}$ (positive and negative), the value $\Delta TE$ and, where relevant, the hysteresis value HY can be fed for display to a stage D, for example a visual display unit, and constitute quality criteria for the particular apparatus tested. The value $\Delta TE$ furthermore serves for manual head adjustment, or is converted, via an automatic means, to a motor-driven head adjustment device, which is then available as a facility at D. However, it is also possible, without carrying out head adjustment, to determine each TE value, based on the average mean value OM for each track, and to make an appropriate correction to the write or read signal by computational and electronic means in order to compensate or minimize these errors either directly during the write operation or during the read operation.

In FIG. 5, the control commands for carrying out the method according to the invention are contained in the erasable memory (EPROM) and can thus easily be altered. The input unit T can be in the form of a keyboard, and is used to start the measuring or adjustment process.

Using the novel method and the arrangement for this purpose, it was possible in practice to increase the compatibility of the apparatuses by about 20%, to reduce the rejection rate during manufacture by about 15%, and to minimize servicing.

We claim:

1. A method for detecting error signals in a magnetic disk drive including a head positioning system, said method comprising the use of a magnetic test disk which has test signals recorded in a plurality of test tracks located in place of recording tracks and distributed over the recording area of the magnetic disk, at least one of said test tracks being predetermined as a reference test track, the test signals in said test tracks being read, deviations of the read signals from their desired position and desired amplitude being determined and mean values being derived therefrom, wherein said test signals consist of adjustment signals which are recorded alternately on either side of the center line of the recording track and are of the same amplitude and of orientation signals which divide the adjustment signals into groups and whose amplitude differs from that of the adjustment signals, within each group of adjustment signals, their actual position and actual amplitude are determined and a group mean value is derived therefrom, the group mean values of each individual test track are used to calculate a track mean value, the latter is stored, and the track mean values of a number of test tracks are used to calculate an overall mean value, and this is stored.

2. A method as claimed in claim 1, wherein, for disk drives having step motor positioning systems, the position of the test tracks on the test disk is just out of accord with the number of motor phases of the particular step motors.

3. A method as claimed in claim 1, in which the positioning system of the disk drive contains a 4-phase step motor, wherein the test signals of every third recording track are read and evaluated.

4. A method as claimed in claim 1, in which the positioning system of the drive has a 3-phase step motor, wherein the test signals of every fourth recording track are read and evaluated.

5. A method as claimed in claim 1, wherein, for disk drives having 3-phase or 4-phase step motor positioning systems, the test signals in every second recording track or the test signals in every third recording track of the same test disk are read and evaluated.

6. A method as claimed in claim 1, wherein the test signals are read and processed serially, beginning with said reference test track, in a first direction of increasing or decreasing track numbers, after which the test signals of the test tracks are read and processed serially in the second direction after reversing its direction of reading, and the two-direction mean values are summed to give the overall mean value.

7. A method as claimed in claim 6, wherein the stored overall mean value is subtracted from the track mean value of the reference test track, and the resulting mean value is used for head position correction on the reference test track.

8. A magnetic test disk for use in a method as claimed in claim 1, the test signals consisting of adjustment signals which are recorded alternately on either side of the center line of the track and have the same amplitude and orientation signals which divide the adjustment signals into groups and have a different amplitude, which comprises a plurality of test tracks which are recorded in every third or fourth recording track, distributed uniformly over the recording area of the test disk.

9. A magnetic test disk for use in a method as claimed in claim 1, the test signals consisting of adjustment signals which are recorded alternately on either side of the center line of the recording track and have the same amplitude and orientation signals which divide the adjustment signals into groups and have a different amplitude, wherein, over at least part of the recording area, test tracks are recorded alternately in every second and every subsequent third recording track.

10. An arrangement for carrying out the method as claimed in claim 1, which comprises a magnetic test disk on which the test signals consist of adjustment signals which are recorded alternately on either side of the center line of the recording track and have the same amplitude and of orientation signals which divide the adjustment signals into groups and have a different amplitude, and a plurality of test tracks which are recorded in every third or fourth recording track, or every second and third recording track, distributed uniformly over the recording area of the test disk, and which comprises a circuit arrangement which contains a control stage for controlling the head positioning system in the 3-track, 4-track or 2-track scanning cycle and which contains, connected to the scanning head; an evaluation stage, a mean value calculation stage and a storage stage for the mean value signals, and a display and/or write stage for the overall mean value.

11. An arrangement as claimed in claim 10, wherein the control stage controls the head positioning system so that the scanning head system, starting from a predetermined initial test track, in particular the reference test track, reads the test tracks in a first direction of increasing or decreasing track numbers and, after reversing its direction of reading into the second direction, reads the test tracks in the second direction.

12. An arrangement as claimed in claim 10, wherein, after storage of the overall mean value, the control stage controls the guiding of the scanning head system, via the positioning system, over the reference test track, and the track mean value of the reference track is either determined again or taken from said storage stage, after which the overall mean value is subtracted from the track mean value of the reference track, and the resulting mean value is displayed and/or made available for an automatic head adjustment device.

13. A method for detecting error signals in a magnetic disk drive including a head positioning system, said method comprising the use of a magnetic test disk which has test signals recorded in a plurality of test tracks located in place of recording tracks and distributed over the recording area of the test disk, at least one of said test tracks being predetermined as a reference test track, the test signals in said test tracks being read, deviations of the read signals from their desired position and desired amplitude being determined and mean values being derived therefrom, wherein said test signals consist, in a conventional manner, of adjustment signals which are recorded alternately on either side of the center line of the recording track and are of the same amplitude and of orientation signals which divide the adjustment signals into groups and whose amplitude differs from that of the adjustment signals, within each group of adjustment signals, their actual position and actual amplitude are determined and a group mean value is derived therefrom, the group mean values of each individual test track are used to calculate a track mean value, the latter is stored, the track mean values of a number of test tracks are used to calculate an overall mean value, and this is stored, and said stored track mean value and said overall mean value are used at least for correction in said head positioning system.

* * * * *